United States Patent [19]

Wolff et al.

[11] Patent Number: 5,595,426
[45] Date of Patent: Jan. 21, 1997

[54] LOCKER DOOR RETROFIT ASSEMBLY

[75] Inventors: John C. Wolff, Columbus; Scott R. Gardner, Dublin; Delbert P. Keisling, Jr., Clarks Summit, all of Ohio

[73] Assignee: Compression Polymers Group, Pa.

[21] Appl. No.: 356,490

[22] Filed: Dec. 15, 1994

Related U.S. Application Data

[63] Continuation-in-part of Ser. No. 196,660, Feb. 10, 1994.

[51] Int. Cl.⁶ .......................... A47B 43/00; A47B 47/00; E06B 1/10
[52] U.S. Cl. .......................... 312/109; 52/204.1; 16/390; 16/392; 312/326; 312/111
[58] Field of Search .................. 312/109, 108, 312/199, 198, 213, 23, 257.1, 263, 265.5, 329, 326, 245, 242, 107.5, 111; 49/62, 63; 52/204.1; 16/389, 390, 392

[56] References Cited

U.S. PATENT DOCUMENTS

| | | | |
|---|---|---|---|
| 2,805,740 | 9/1957 | Quinn | 16/389 X |
| 2,869,953 | 1/1959 | Miller et al. | 312/265.5 X |
| 2,887,193 | 5/1959 | Sitler | 16/392 X |
| 3,274,735 | 9/1966 | Stackhouse | 52/204.1 X |
| 3,566,539 | 3/1971 | Ridgley | 16/389 X |
| 3,619,853 | 11/1971 | Merrill | 16/389 X |
| 4,012,868 | 3/1977 | Andruszkiewicz | 16/389 X |
| 4,190,929 | 3/1980 | Palka | 312/245 X |
| 4,289,363 | 9/1981 | Andersson et al. | 312/199 X |
| 4,447,099 | 5/1984 | French et al. | 312/257.1 |
| 4,891,862 | 1/1990 | Holan | 16/389 X |
| 5,172,970 | 12/1992 | Momose et al. | 312/329 |
| 5,299,862 | 4/1994 | Rankine | 312/329 |
| 5,310,254 | 5/1994 | Dallaire | 312/213 |
| 5,368,380 | 11/1994 | Mottmiller et al. | 312/263 |
| 5,483,771 | 1/1996 | Herbst | 52/204.1 X |

*Primary Examiner*—Peter M. Cuomo
*Assistant Examiner*—Robert J. Sandy
*Attorney, Agent, or Firm*—Standley & Gilcrest

[57] ABSTRACT

A locker door retrofit assembly is disclosed which is adapted for replacing door assemblies on metallic or other lockers with a plastic door assembly. The locker door retrofit assembly may include a plastic jamb hinge that covers the existing hinge and a plastic jamb lock that receives a plastic door assembly when in a closed orientation.

9 Claims, 6 Drawing Sheets

LOCKER DOOR RETROFIT ASSEMBLY

The present application is a continuation-in-part of application for U.S. patent Ser. No. 08/196,660, by A. Keisling, et al., filed Feb. 10, 1994, entitled "LOCKER", which is incorporated herein by reference.

BACKGROUND AND SUMMARY OF THE INVENTION

The present invention relates generally to lockers and more particularly to locker door retrofit assemblies. The present invention is designed to replace existing metallic door or other assemblies with a locker door assembly comprised of a more suitable material.

Lockers for storing clothing, articles of merchandise, etc., are commonly constructed. Storage lockers are found in many different settings. For example, athletic facilities have lockers to allow athletes to store their possessions while participating in athletic events. Community swimming pools typically have lockers for storing street clothes while a person swims. Lockers are also found in industry where they are used for several purposes, such as the storage of equipment, work clothes, chemicals, and other items which are preferably kept in such a concealed environment when not in use. Lockers are also commonly found in airports, hospitals, school hallways, prisons, and many other sites too numerous to mention.

Most commonly steel sheet metal is used as a primary construction material with metal fasteners used to assemble the finished locker. Metallic lockers suffer from several disadvantages. They are easily damaged or marred in some way such as by dents, scratches and graffiti. Moreover, the metal is subject to damage from rust, odors, delamination and fading.

Attempts have been made to solve the above-mentioned problems by wholly replacing these metallic lockers with plastic or wood lockers. Some storage lockers were built into either an existing wall of a building or into a building wall while under construction. These in-wall lockers may be expensive to replace with plastic lockers. These problems prevent many from taking advantage of the properties that plastic offers over steel sheet metal.

A need exists for a locker that is designed to overcome the aforementioned disadvantages. The present invention is a locker door retrofit assembly comprised of a material designed to overcome the above disadvantages, such as a plastic or a composite material. The following disclosure describes a plastic locker door retrofit assembly. However, it must be understood that any non-metal material that exhibits the desired characteristics may be utilized for the present invention.

In the present invention existing metallic doors and metallic jams or doors of other materials, such as wood, may be replaced with the plastic locker door assembly. Due to the plastic construction of the door assembly, the locker face will be resistant to many forms of abuse that lockers commonly receive. The locker doors will not dent as will metal lockers. The locker door of the present invention will maintain its color throughout its entire cross-section. Due to the preferred homogeneous nature of the plastic door assembly, the lockers of the-present invention will not delaminate. Furthermore, most materials used in the application of graffiti are readily removed from plastic panels to return the locker doors to the original surface appearance. The remaining metallic body of the locker system is hidden behind the plastic face and is thus protected. Moreover, the substitution with a plastic door assembly provides many cosmetic and aesthetically pleasing attributes to the locker system. These plastic lockers may carry almost any color scheme desirable. Colors may be chosen to match the surrounding decor, to provide a color coding scheme and/or to provide a medium for an organizational theme.

Other features and advantages of the present invention will be apparent from the following description and claims and are illustrated in the accompanying drawings which show preferred features of the present invention and the principles thereof.

DETAILED DESCRIPTION OF THE PREFERRED EMBODIMENTS

Figure 1:
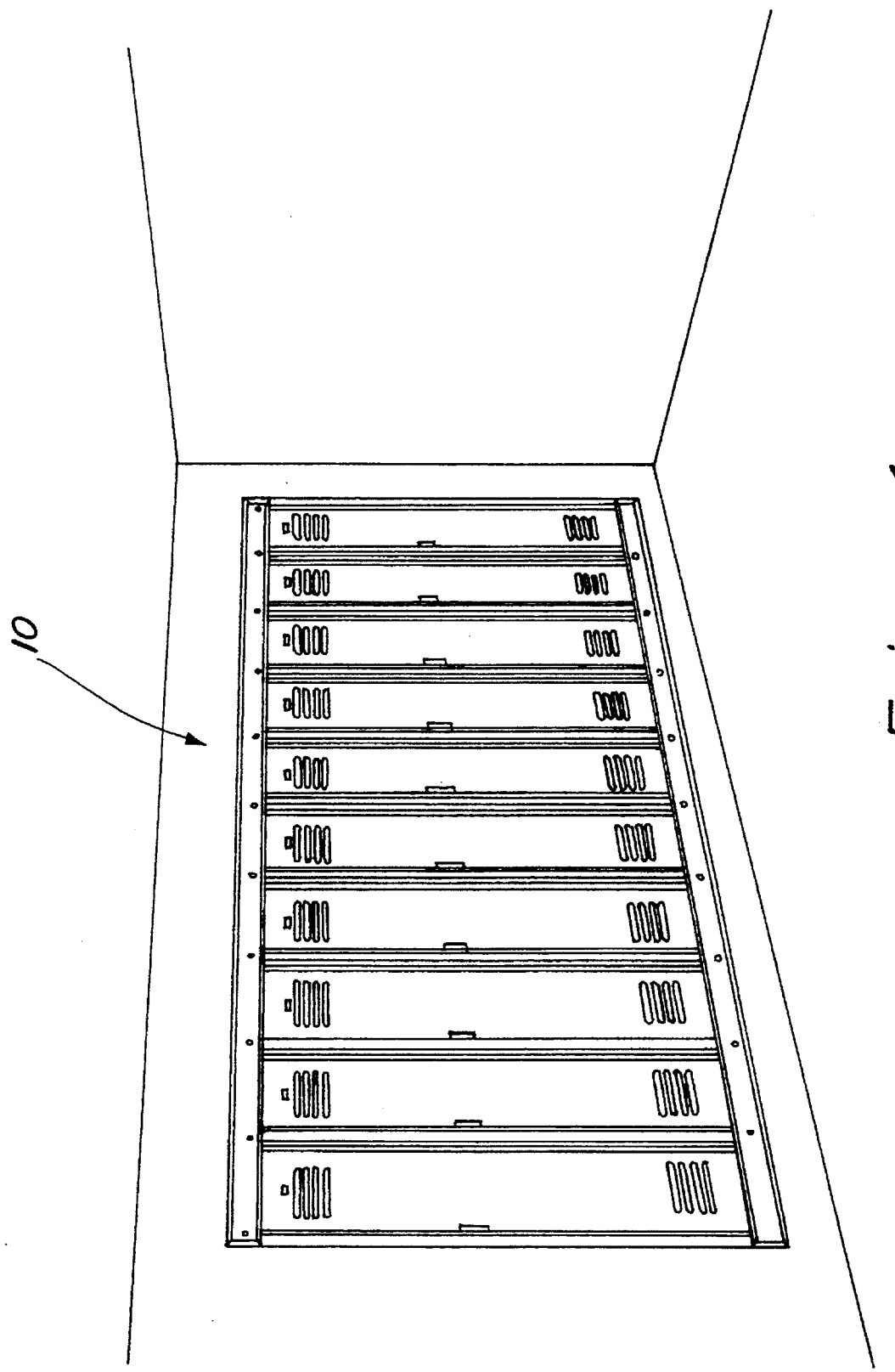
FIG. 1 is a perspective view of the installed locker door retrofit assembly of the present invention on an in-wall locker system.

Referring now to the drawings, FIG. 1 shows the present invention installed on an in-wall locker system shown generally at 10. The following description and accompanying figures disclose a locker door assembly with a right-hand opening. It must be understood that the present invention also encompasses left-hand openings and that the knowledge to provide such is well known in the art. Although existing metal lockers are well suited for retrofit with the present invention, lockers made of other materials would likewise benefit from the present invention.

Figure 2:
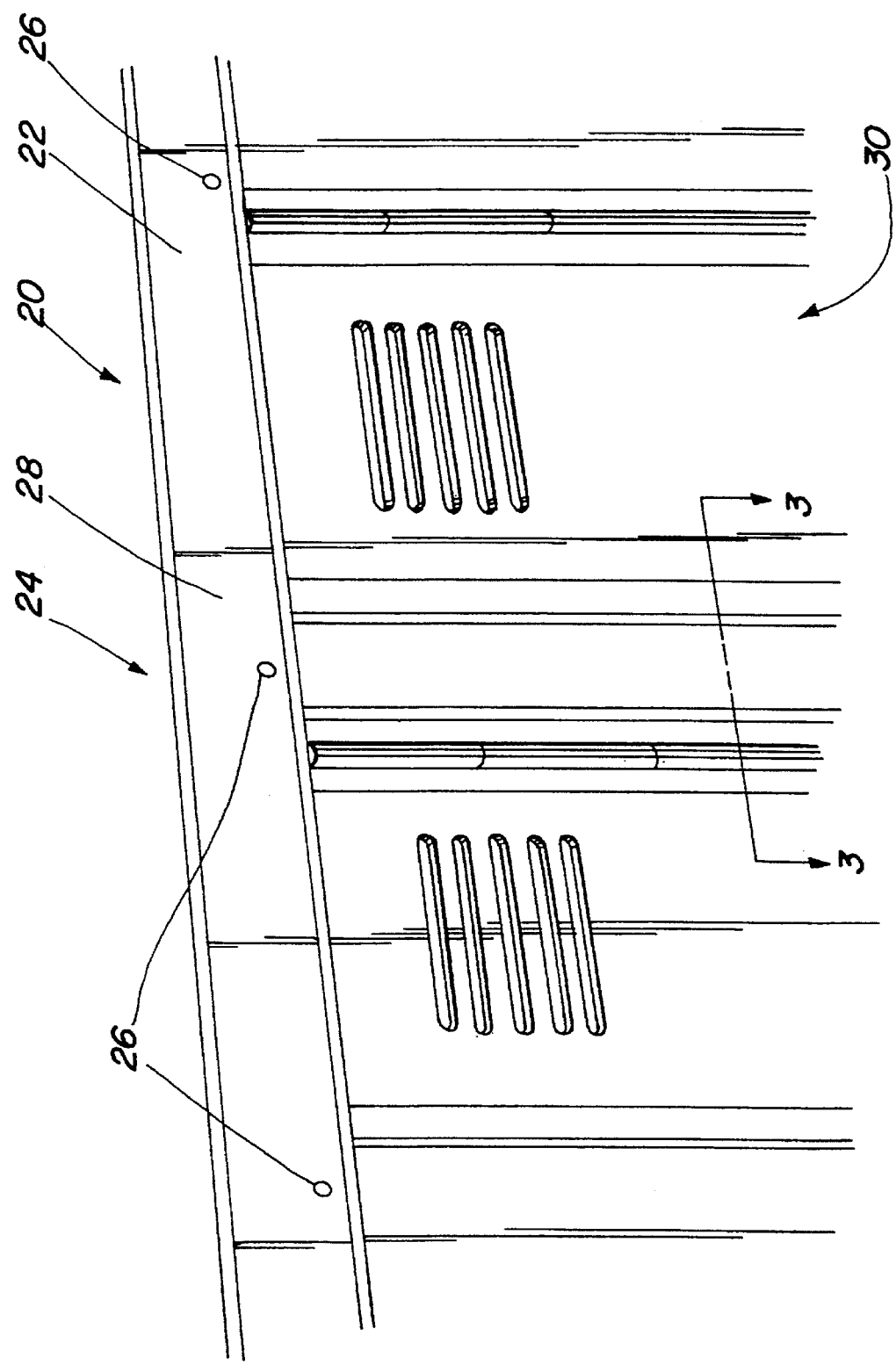
FIG. 2 is a detail view of the trim along the top of the locker door retrofit assembly shown in FIG. 1.

FIG. 2 shows generally the trim at the top of the plastic locker door at 20. A long strip of material 22 is fastened to wall 24 with fasteners shown generally at 26 to form the top trim 28. Top trim 28 serves to cosmetically and mechanically smooth the transition from the locker retrofit assembly 30 to the building walls 24. Fasteners, shown generally at 26, in the preferred embodiment include countersunk screws with matching caps, but any method of fastening the trim 28 to the wall 24 may be used.

Figure 3:
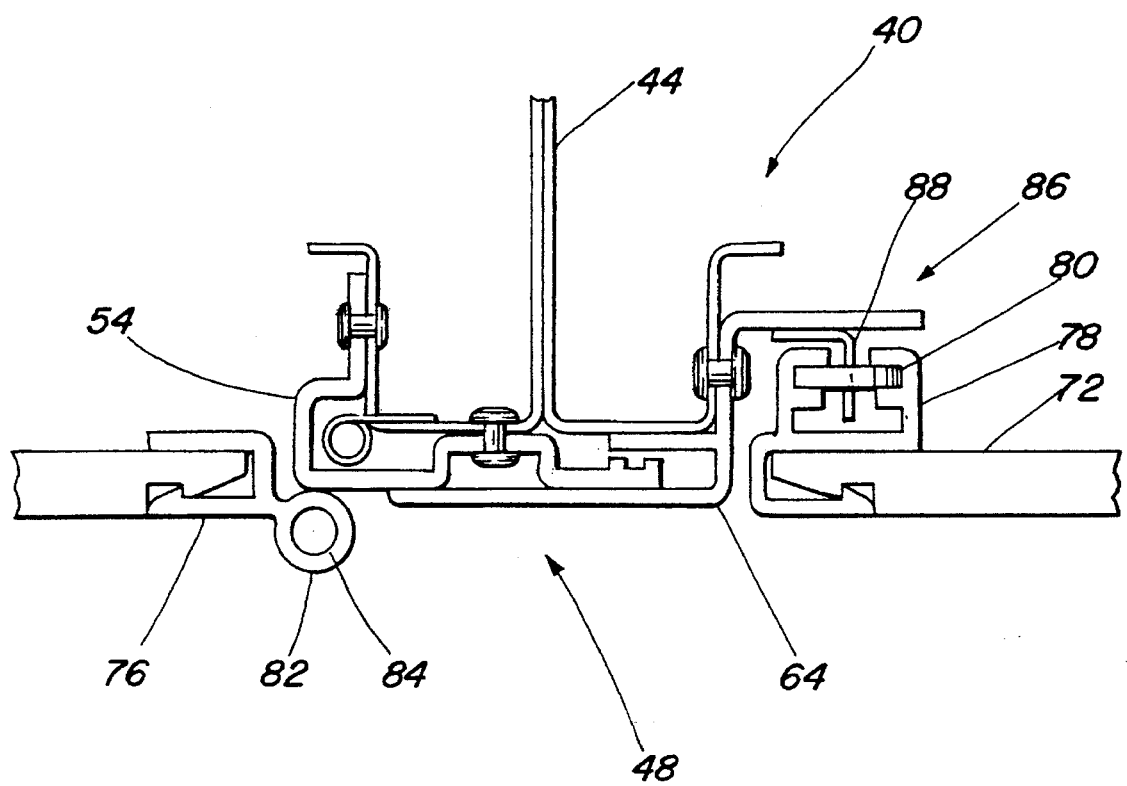
FIG. 3 is a section view taken along line 3—3 of FIG. 2.

FIG. 3 shows a section view of the locker door retrofit assembly installed on an in-wall locker system at 40. The section of wall allows a view of the top of the existing metallic in-wall portions of a locker system at 44. The interface between the locker door retrofit assembly 30 and the in-wall locker system at 44 can be viewed at 48.

Figure 6:
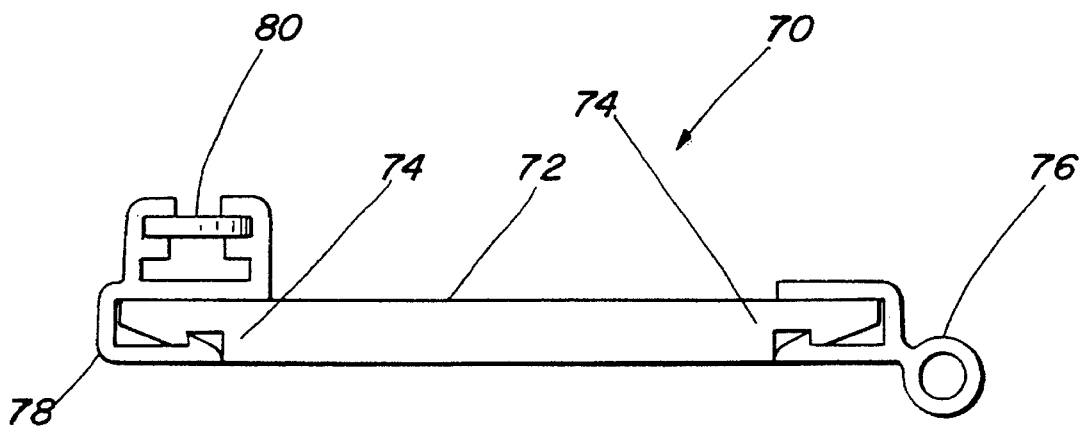
FIG. 6 is a plan view of the door of a preferred embodiment of the present invention.
Figure 4:
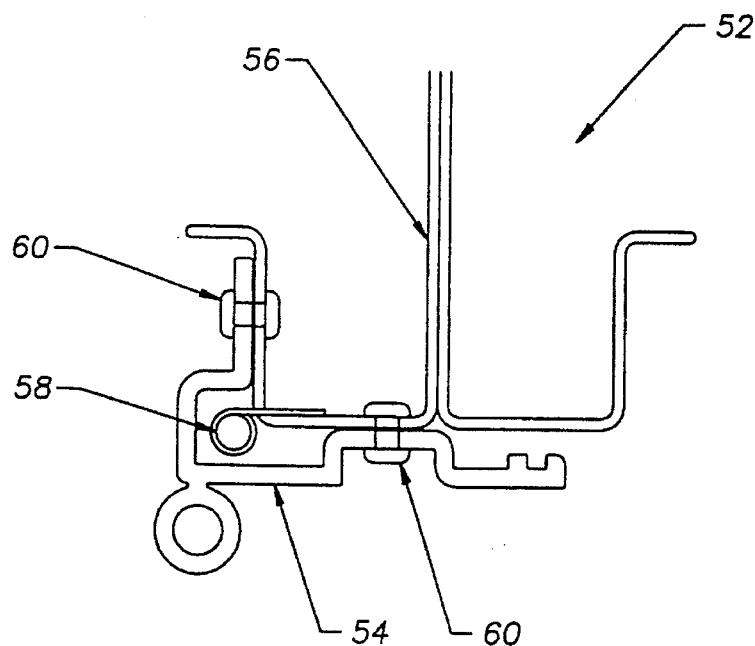
FIG. 4 is a sectional view, looking down from overhead, of the door hinge of a preferred embodiment of the present invention attached to the metallic locker wall.
Figure 5:
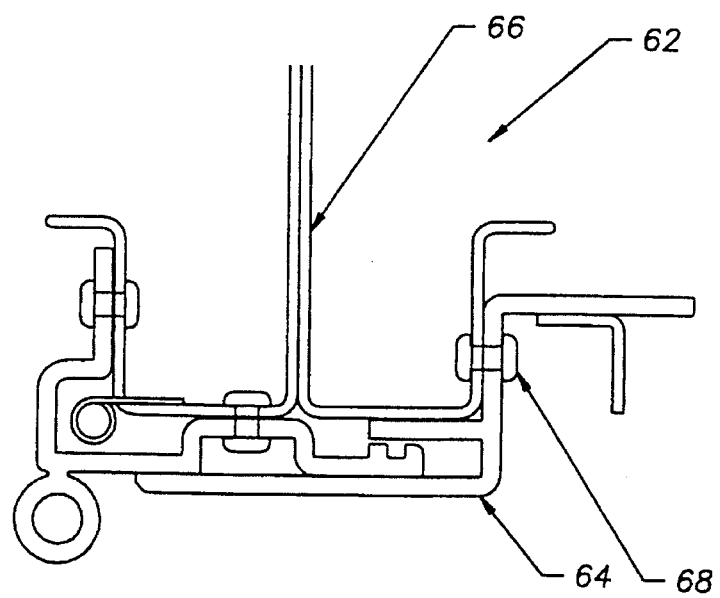
FIG. 5 is a sectional view, looking down from overhead, of the jamb of a preferred embodiment office present invention attached to the metallic wall.
Figure 7:
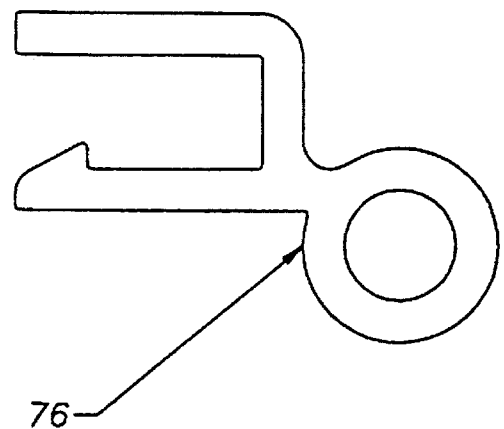
FIG. 7 is a detailed plan view of the door hinge of a preferred embodiment of the present invention.
Figure 8:
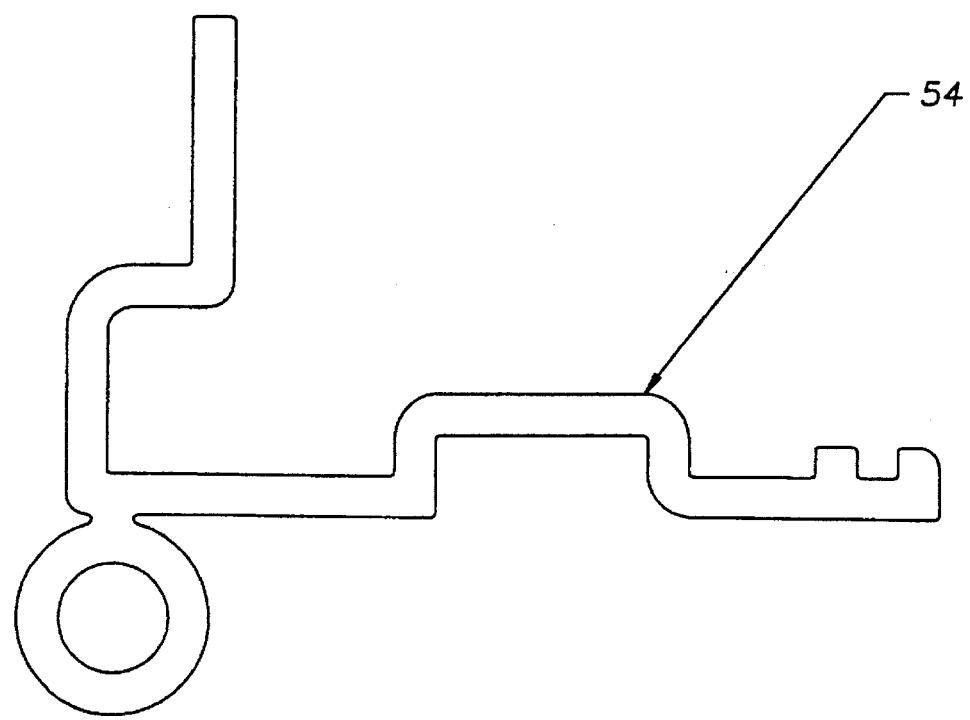
FIG. 8 is a detailed plan view of the jamb hinge of a preferred embodiment of the present invention.
Figure 9:
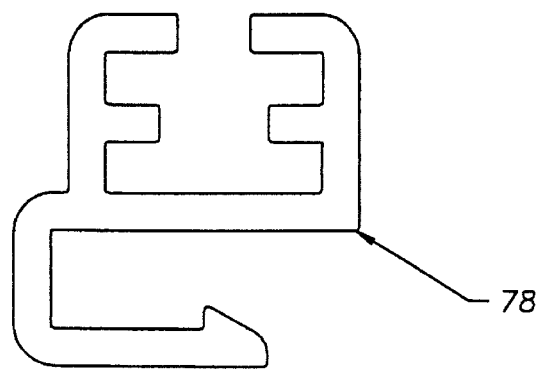
FIG. 9 is a detailed plan view of the door lock of a preferred embodiment of the present invention.
Figure 10:
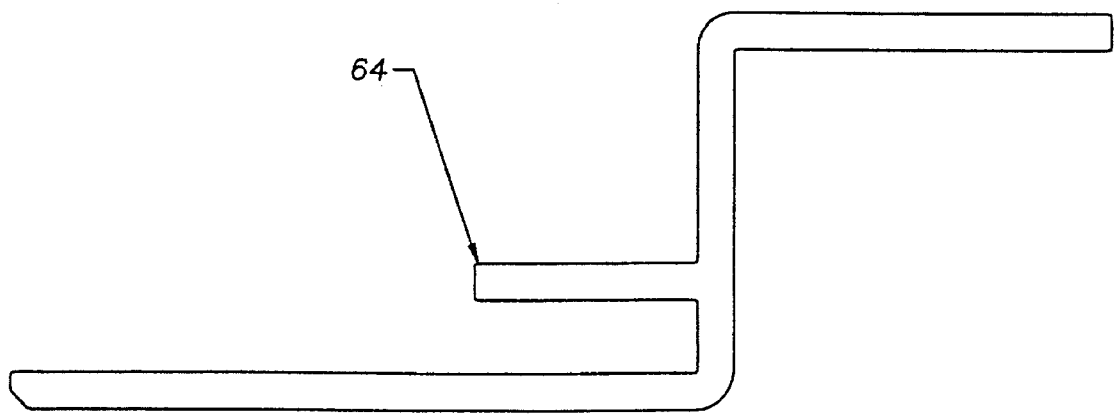
FIG. 10 is a detailed plan view of the jamb lock of a preferred embodiment of the present invention.

For a detailed description of the assembly of this interface refer to FIGS. 4, 5 and 6. FIG. 4 shows the installation of the jamb hinge on the in-wall locker at 52. Jamb hinge 54 is preferrably placed against the right-sidewall of the in-wall locker at 56. Note, the configuration of the jamb hinge 54 allows open space to accomodate the existing hinge of the in-wall locker at 58, if so desired. Jamb hinge 54 is attached to the in-wall locker 56 with fasteners shown generally at 60.

Referring now to FIG. 5, installation of the jamb lock is shown generally at 62. Jamb lock 64 is placed against the left-sidewall of the in-wall locker 66 and fastened thereto with a fastener shown generally at 68. The jamb lock 64 is adapted to be slidably adjustable in relation to the jamb hinge 54, prior to securing the jamb lock 64 to the side wall, thereby allowing the jamb lock 64 and the jamb hinge 54 to fit on adjacent lockers of variable dimensions.

Referring now to FIG. 6, the assembly of the door is shown generally at 70. A door panel is shown at 72 and is configured to receive side attachments at 74. A door hinge is shown at 74 that may snap into a locking relationship with door panel 72 at 74. A door lock, shown at 78, snaps into a locking relationship with the door panel 72 at 74. The door Locker 78 may also include a door latch bar 80.

Referring back to FIG. 3, the installation of the door is shown at 40. The door hinge 76 is mated with the jamb hinge 54 at 82 and is locked by rod 84 into a hinging relationship. Note, the preferred locking relationship between the jamb lock 64 with the door 72 at 86, when the locker door is in a closed position as shown. The door lock 78 of the door 72 allows the door latch bar 80 to engage the latch 88 of the jamb lock 64. The door latch bar 80 is in a sliding relationship with the door lock 78 for engaging the jamb lock 64 when the door is in a closed position. This condition locks the door 72 into a closed position.

FIGS. 7, 8, 9, and 10 show preferred detail views of the door hinge 76, jamb hinge 54, door lock 78 and jamb lock 64, respectively. Thus, the present invention enables a plastic door to be connected to an otherwise metal body locker, to replace a metal door.

The scope of the invention is not to be considered limited by the above disclosure, and modifications are possible without departing from the spirit of the invention as evidenced by the following claims.

What is claimed is:

1. A locker door retrofit assembly for an existing locker which has a first side wall with an existing hinge attached thereto, and a second side wall, the locker door retrofit assembly comprising:

a non-metallic jamb hinge adapted to be attached to the first side wall, wherein the jamb hinge is adapted to enclose the existing hinge;

a non-metallic jamb lock adapted to be attached to the second side wall, wherein said jamb lock is adapted to be slidably adjustable in relation to said jamb hinge, prior to securing said jamb lock to said side wall, thereby allowing said jamb lock and said jamb hinge to fit on adjacent lockers of variable dimensions; and a non-metallic replacement door having a non-metallic door hinge and a latch, wherein the door hinge is hingedly attached to the jamb hinge and the latch engages the jamb lock when the door is closed.

2. The locker door retrofit assembly of claim 1 further comprising a second non-metallic jamb lock adapted to be attached to the first side wall wherein the second jamb lock partially covers the jamb hinge.

3. The locker door retrofit assembly of claim 2 wherein the second jamb lock is adapted to be slidably adjustable in relation to the jamb hinge prior to attachment of the second jamb lock to the first side wall, allowing the second jamb lock and the jamb hinge to fit on adjacent lockers of variable dimensions.

4. The locker door retrofit assembly of claim 1 wherein the jamb hinge is made of plastic.

5. The locker door retrofit assembly of claim 1 wherein the jamb lock is made of plastic.

6. The locker door retrofit assembly of claim 1 wherein the door is made of plastic.

7. The locker door retrofit assembly of claim 1 wherein the door hinge is made of plastic.

8. The locker door retrofit assembly of claim 1 wherein the door lock is made of plastic.

9. The locker door retrofit assembly of claim 1 further comprising a door latch in a sliding relationship with the door lock for engaging the jamb lock when the door is closed.

* * * * *